United States Patent
Vargas et al.

(10) Patent No.: US 10,896,098 B2
(45) Date of Patent: Jan. 19, 2021

(54) PROVIDING AND MANAGING DATA PROTECTION BY USING INCREMENTAL FOREVER FOR STORAGE TO CLOUD OBJECT STORES

(71) Applicant: INTERNATIONAL BUSINESS MACHINES CORPORATION, Armonk, NY (US)

(72) Inventors: Omar Vargas, Port Orange, FL (US); Avishai H. Hochberg, San Jose, CA (US); Thomas F. Ramke, Jr., Vonore, TN (US); David G. Derk, Gibsonia, PA (US); Peter Tanenhaus, Vestal, NY (US); Stefan Bender, Woerrstadt (DE); Michael S. Fruchtman, San Jose, CA (US); Vadzim I. Piletski, San Jose, CA (US); James P. Smith, Redwood City, CA (US); Christopher Zaremba, Endicott, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/384,695

(22) Filed: Apr. 15, 2019

(65) Prior Publication Data
US 2020/0327015 A1    Oct. 15, 2020

(51) Int. Cl.
*G06F 11/14* (2006.01)
*G06F 3/06* (2006.01)
(Continued)

(52) U.S. Cl.
CPC .......... *G06F 11/1451* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS

| 2013/0325810 A1 | 12/2013 | Elder et al. |
| 2014/0006465 A1* | 1/2014 | Davis ............ G06F 16/183 707/827 |

(Continued)

OTHER PUBLICATIONS

Mell, P., et al., "Effectively and Securely Using the Cloud Computing Paradigm", NIST, Information Technology Laboratory, Oct. 7, 2009, 80 pp.

(Continued)

*Primary Examiner* — Edward J Dudek, Jr.
*Assistant Examiner* — Ralph A Verderamo, III
(74) *Attorney, Agent, or Firm* — Janaki K. Davda; Konrad Raynes Davda & Victor LLP

(57) ABSTRACT

Provided are techniques for providing and managing data protection by using incremental forever for storage to cloud object stores. An incremental offload is performed by using one or more extents to identify blocks of data for a version of a virtual machine in operational recovery storage to be offloaded to a cloud object store, wherein each of the one or more extents identifies locations of the blocks of data. The blocks of data are converted to objects in an incremental forever data format. The objects are offloaded to the cloud object store. The details of the offloading of the objects are stored in a local database in the operational recovery storage. The local database is copied from the operational recovery storage to the cloud object store as a database copy.

18 Claims, 12 Drawing Sheets

(51) Int. Cl.
*G06F 9/455* (2018.01)
*H04L 29/08* (2006.01)

(52) U.S. Cl.
CPC ........ *G06F 3/0619* (2013.01); *G06F 9/45558* (2013.01); *G06F 11/1464* (2013.01); *H04L 67/1095* (2013.01); *G06F 2009/45583* (2013.01); *G06F 2009/45591* (2013.01)

(56) References Cited

U.S. PATENT DOCUMENTS

| | | | |
|---|---|---|---|
| 2016/0203054 A1* | 7/2016 | Zhang | G06F 11/1451 707/645 |
| 2017/0168903 A1* | 6/2017 | Dornemann | G06F 9/45558 |
| 2017/0371547 A1* | 12/2017 | Fruchtman | G06F 11/1448 |
| 2018/0121453 A1 | 5/2018 | Jain et al. | |
| 2018/0196816 A1 | 7/2018 | Maybee et al. | |
| 2019/0163763 A1* | 5/2019 | Pandey | G06F 11/301 |
| 2020/0089409 A1* | 3/2020 | Ankireddypalle | G06F 3/0665 |

OTHER PUBLICATIONS

Mell, P., et al., "The NIST Definition of Cloud Computing", NIST, Special Publication 800-145, Sep. 2011, 7 pp.

* cited by examiner

PROVIDING AND MANAGING DATA PROTECTION BY USING INCREMENTAL FOREVER FOR STORAGE TO CLOUD OBJECT STORES

BACKGROUND

1. Field of the Invention

Embodiments of the invention relate to providing and managing data protection by using incremental forever for storage to cloud object stores.

2. Description of the Related Art

Operational recovery backup products that utilize snapshots of data deliver a unified operational recovery system for hyper-visors and applications. A hyper-visor may be described as a Virtual Machine Monitor (WM) and is computer software, firmware or hardware that creates and runs Virtual Machines (VMs). A computer on which a hypervisor runs one or more virtual machines may be called a host machine, and each virtual machine may be called a guest machine.

For example, with some conventional systems, all backups are captured into a snapshot repository, which is a ZFS file system with logical snapshot capability. A ZFS file system may be described as a local file system and logical volume manager that is able to direct and control the placement, storage and retrieval of data.

During each backup, the ZFS capability is used to manage multiple versions of the application/VM. After each incremental backup, the backup data on the snapshot repository will have the latest state, and the ZFS snapshot capability retains the previous state. As a result, no incremental information is retained.

Some ZFS based solutions may use a zfs_send command to transfer incremental changes, but require a separate mechanism to avoid the need to restore the base and all incremental changes first in order to perform a full point-in-time restore. This is a replication solution. Even if zfs_send is used in conjunction with a block mapping merge solution, with each transfer of incremental changes, the amount of time and complexity required to merge also increases. Also, these solutions require a restore to the operation recovery storage before being able to recover to a production environment.

Other solutions that transfer incremental changes clone data on the cloud object store to create a full point-in-time recovery. This increases the number of objects to manage and uses a lot of cloud object store space.

Solutions based on a device driver, which act as a gateway (translates block requests to objects on the cloud storage), face caching (for data transformation like decompression), kernel integration and performance challenges.

SUMMARY

In accordance with other embodiments, a computer program product is provided for providing and managing data protection by using incremental forever for storage to cloud object stores. The computer program product comprises a computer readable storage medium having program code embodied therewith, the program code executable by at least one processor to perform operations. An incremental offload is performed by using one or more extents to identify blocks of data for a version of a virtual machine in operational recovery storage to be offloaded to a cloud object store, wherein each of the one or more extents identifies locations of the blocks of data. The blocks of data are converted to objects in an incremental forever data format. The objects are offloaded to the cloud object store. The details of the offloading of the objects are stored in a local database in the operational recovery storage. The local database is copied from the operational recovery storage to the cloud object store as a database copy.

In yet other embodiments, a computer system is provided for providing and managing data protection by using incremental forever for storage to cloud object stores. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. An incremental offload is performed by using one or more extents to identify blocks of data for a version of a virtual machine in operational recovery storage to be offloaded to a cloud object store, wherein each of the one or more extents identifies locations of the blocks of data. The blocks of data are converted to objects in an incremental forever data format. The objects are offloaded to the cloud object store. The details of the offloading of the objects are stored in a local database in the operational recovery storage. The local database is copied from the operational recovery storage to the cloud object store as a database copy.

In accordance with embodiments, a computer-implemented method is provided for providing and managing data protection by using incremental forever for storage to cloud object stores. The computer-implemented method comprises operations. An incremental offload is performed by using one or more extents to identify blocks of data for a version of a virtual machine in operational recovery storage to be offloaded to a cloud object store, wherein each of the one or more extents identifies locations of the blocks of data. The blocks of data are converted to objects in an incremental forever data format. The objects are offloaded to the cloud object store. The details of the offloading of the objects are stored in a local database in the operational recovery storage. The local database is copied from the operational recovery storage to the cloud object store as a database copy.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments advantageously provide and manage data protection by using incremental forever, in an efficient manner, for storage of snapshots to cloud object stores. With incremental forever, all blocks of data are backed up a first time and then the incremental changes since a last backup are backed up for each subsequent backup.

Figure 1:
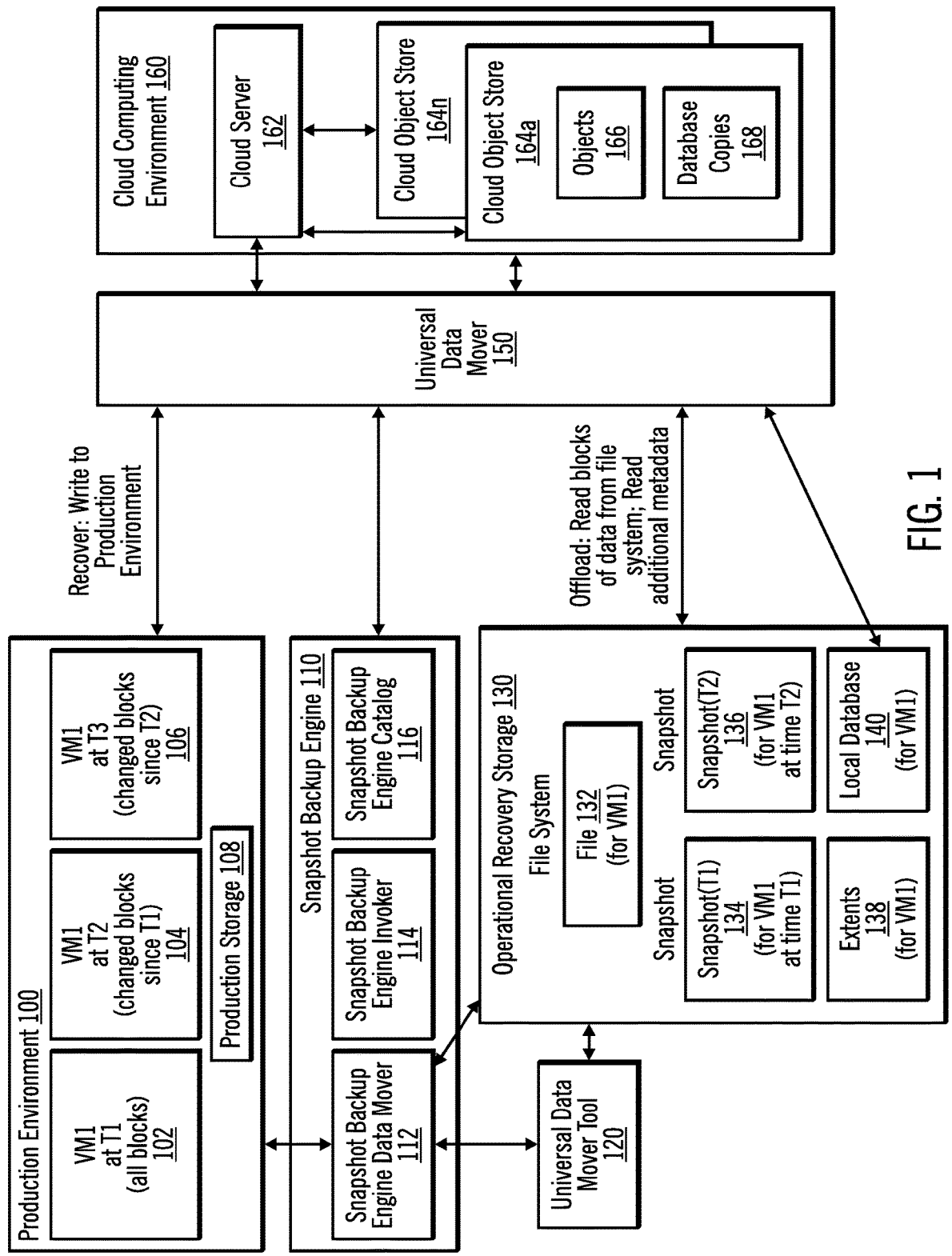
FIG. 1 illustrates, in a block diagram, a computing environment in accordance with certain embodiments.

FIG. 1 illustrates, in a block diagram, a computing environment in accordance with certain embodiments. FIG. 1 illustrates a production environment 100, a snapshot backup engine 110, operational recovery storage 130, a universal data mover 150, a cloud server 162, and one or more cloud object stores 164a . . . 164n. In certain embodiments, the cloud server 162 and each cloud object store 164a . . . 164n are part of a cloud computing environment 160. Each cloud object store 164a . . . 164n may be described as an external cloud repository.

The production environment 100 includes a virtual machine 1 (VM1) at different times. A virtual machine may be described as a backup entity. In this illustration, the production environment 100 includes a virtual machine 1 (VM1) at time T1 102, at time T2 104, and at time T3 106. In this example, virtual machine 1 (VM1) at time 1 (T1) 102 has all blocks of data, virtual machine 1 (VM1) at time 2 (T2) 104 has changed blocks of data since T1, and virtual machine 1 (VM1) at time 3 (T3) 106 has changed blocks of data since T2. In certain embodiments, virtual machine 1 (VM1) at time 2 (T2) 104 and virtual machine 1 (VM1) at time 3 (T3) 106 include all current blocks of data along with information about the changes since the last backup. The production environment 100 also includes production storage 108 (e.g., one or more production disks).

Although embodiments herein refer to virtual machines, the embodiments are applicable to other backup entities, such as databases or files.

The snapshot backup engine 110 includes a snapshot backup engine data mover 112, a snapshot backup engine invoker 114, and a snapshot backup engine catalog 116. The snapshot backup engine data mover 112 moves data between the production environment 100 and the operational recovery storage 130. The snapshot backup engine data mover 112 identifies extents and stores the extents 138 for virtual machine 1 (VMl1) in the operational recovery storage 130.

An extent may be described as metadata that includes a list of descriptors with a starting block to an ending block for blocks of data to be backed up to the cloud object store 164a . . . 164n. The extent describes incremental data (e.g., data of VM1 at time T2 or data of VM1 at time T3). The incremental data may be described as data that has changes since a previous backup point in time. The catalog 116 stores details about each full offload and each incremental offload from the production environment 100 to the cloud object store 164a . . . 164n.

In certain embodiments, the universal data mover 150 provides a universal data mover tool 120. In such embodiments, the universal data mover tool 120 may be invoked by the snapshot backup engine data mover 112. Then, the universal data mover tool 120 identifies extents and stores the identified extents 138 in the operational recovery storage 130. The universal data mover tool 120 may be described as a changed block tracking mechanism during operational backup, which is used for incremental offload. Having the changed block tracking for all versions of backup allows for dissimilar policies between operational backups and offloads (e.g., where operational backups happen once a day, but offloads to the cloud object store 164a . . . 164n happen once a week or once a month).

The operational recovery storage 130 includes, a file 132 for virtual machine 1 (VM1), a snapshot(T1) 134 for virtual machine 1 (VM1), a snapshot(T2) 136 for virtual machine 1 (VM1), extents 138 for virtual machine 1 (VM1), and a local database 140 for virtual machine 1 (VM1). The file 132 is in a file system and stores the latest backup (i.e., blocks of data) for virtual machine 1 (VM1). In certain embodiments, the file 132 has a Virtual Machine Disk (VMDK) format.

In certain embodiments, the extents 138 may be in Open Virtualization Format (OVF), with Resilient Change Tracking (RCT) or Changed Block Tracking (CBT). OVF may be described as an open-source standard for packaging and distributing software applications for virtual machines. RCT may be described as a feature that provides change block tracking capability that tracks changes at the block level. With RCT, blocks of data that have changed since a last backup operation are candidates for the next incremental-forever incremental backup. CBT may be described as feature that helps perform incremental backup.

The universal data mover 150 supports different virtual environments (e.g., from different vendors) and different workloads. Also, the universal data mover 150 moves blocks of data from the operational recovery storage 130 to the cloud object store 164a . . . 164n (either directly or via the cloud server 162) and moves blocks of data from the cloud object store to either the production environment 100 directly or to the operational recovery storage 130 for access by the production environment 100.

The computing environment 160 includes at least one cloud server 162 and at least one cloud object store 164 . . . 164n. Each cloud object store 164a . . . 164n stores objects 166 and database copies 168. In certain embodiments, the database copies 168 include copies of local databases for different virtual machines. For example, the database copies 168 include a copy of the local database 140 for virtual machine 1 (VM1).

In certain embodiments, the universal data mover 150 accesses the cloud object store 164a . . . 164n directly, and in other embodiments, the universal data mover 150 accesses the cloud object store 164a . . . 164n via the cloud server 162. That is, the universal data mover 150 may issue requests to store blocks of data to the cloud server 162, and the cloud server 162 stores the blocks of data to the cloud object store 164a . . . 164n. Also, the universal data mover 150 may issue requests to retrieve blocks of data to the cloud server 162, and the cloud server retrieves the blocks of data from the cloud object store 164a . . . 164n and returns the blocks of data to the universal data mover 150.

Figure 2:
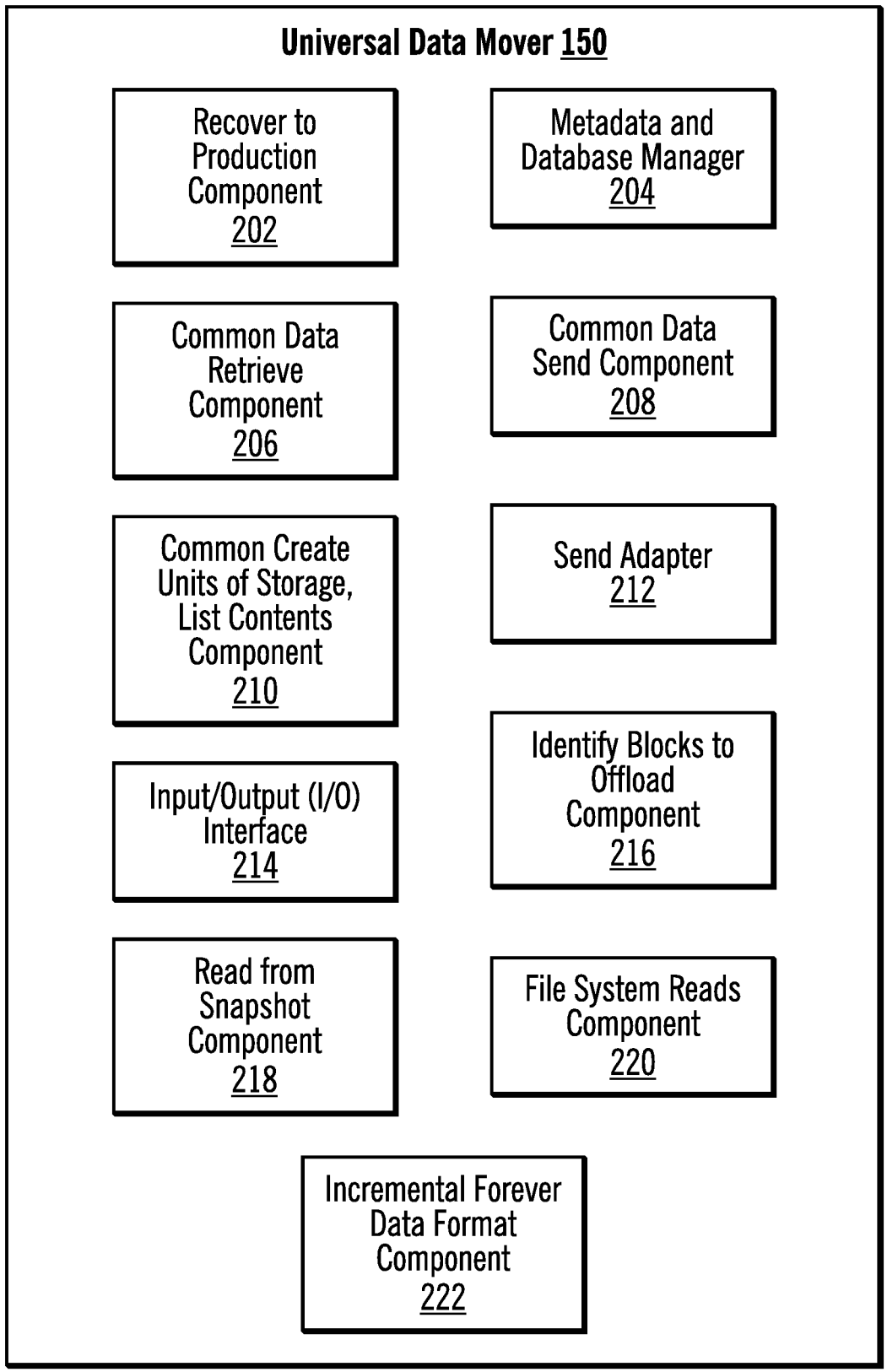
FIG. 2 illustrates, in a block diagram, further details of the universal data mover in accordance with certain embodiments.

FIG. 2 illustrates, in a block diagram, further details of the universal data mover 150 in accordance with certain embodiments. The universal data mover 150 includes a recover to production component 202 to recover blocks of data from the cloud object store 164a . . . 164n to the production environment 100. The universal data mover 150 includes the metadata and database manager 204. The metadata and database manager 204 creates the local database 140 and manages the local database 140. The local database 140 may also be referred to as an object database or object data store.

When offloading, blocks of data are read from the file system file 132, snapshot (T1) 134 and/or snapshot (T2) 136 using the extents 138, which provide metadata about what blocks of data are to be offloaded and where those blocks of data are to be stored.

The universal data mover 150 also includes a common data retrieve component 206, a common data send component 208, a common create units of storage and list contents component 210, and a send adapter 212.

The common data retrieve component 206 may be described as code that knows how to retrieve the blocks of data and metadata from the cloud object store 164a . . . 164n.

For example, the common data retrieve component 206 retrieves the blocks of data and passes the blocks of data to the recover to production component 202 to get the blocks of data onto the production environment 100.

The common data send component 208 may be described as code that knows how to prepare the blocks of data and the metadata in the proper format for storing in the cloud object store 164a . . . 164n.

The common create units of storage and list contents component 210 may be described as code that understands cloud communication protocol and is able to connect to the cloud object store 164a . . . 164n, query objects at the cloud object store 164a . . . 164n, etc.

The send adapter 212 may be described as managing the sending of the blocks of data to the cloud object store 164a . . . 164n. The send adapter 212 knows the cloud communication protocol and is able to send data over a network to the cloud storage 164a . . . 164n (e.g., in parallel streams, single streams, etc.).

In addition, the universal data mover 150 includes an Input/Output (I/O) interface 214, an identify blocks to offload component 216, a read from snapshot component 218, a file system reads component 220, and an incremental forever data format component 222.

The I/O interface 214 may be described as a JavaScript® Object Notation (JSON) interface. (JavaScript is a registered trademark of Oracle Corporation in the United States and/or other countries.)

The identify blocks to offload component 216 identifies blocks of data to be offloaded to the cloud storage 164a . . . 164n. In certain embodiments, the identify blocks to offload component 216 identifies blocks of data and represents the blocks of data in the form of extents. In other embodiments, the universal data mover tool 120 may do this.

The read from snapshot component 218 reads blocks of data from snapshots, such as snapshot(T1) 134 and/or snapshot(T2) 136.

The file system reads component 220 reads blocks of data from a file, such as file 132.

The incremental forever data format component 222 transforms the blocks of data into an incremental forever data format that is used to send the blocks of data to the cloud storage 164a . . . 164n. In certain embodiments, the incremental forever data format component 222 maps the blocks of data to objects using megablock data files, control files that describe the structure of the megablocks, and bitmap files.

Embodiments combine the elements of FIGS. 1 and 2 to enable an offload of blocks of data from the operational recovery storage 130 for the production system 100 to the cloud object store 164a . . . 164n for longer term storage, while maintaining the ability to offload changed data only (incremental forever chain), controlling offload versions of virtual machines, and allowing for recovery from the cloud object store 164a . . . 164n directly to the production environment 100 (without having to stage first to the operational recovery storage).

The universal data mover 150 ingests blocks of data from the operational recovery storage 130 and transforms the blocks of data into objects, and future changes may be incrementally transferred (or offloaded) to the cloud object store 164a . . . 164n. Offload may be described as the action of moving data from operational recovery storage 130 (e.g., fast disk) into the cloud object store 164a . . . 164n (e.g., for long term storage).

The local database 140 may be described as a single, small, self-describing, transportable database per virtual machine is used to track the groupings between incrementally stored objects. Self-describing indicates that the database 140, 168 has the information to describe itself so that the database 140, 168 may be used for offloading. The local database 140 stores metadata about the objects, such as groupings (relationships) between the objects. In certain embodiments, each object belongs to a group, and this grouping information is stored as metadata. The local database 140 is sent to the cloud object store 164a . . . 164n as part of the offload to cloud storage and saved as a database copy 168. In certain embodiments, the local database 140 exists for the offloading operation and then is deleted from the database 130, and, in such embodiments, the database copy 168 is copied over as the local database 140 for use in recovery. In certain other embodiments, the local database 140 is not deleted to avoid having to copy the database copy 168 from the cloud object store 164a . . . 164n for use in recovery.

In certain embodiments, the database 140, 168 is a cumulative database, where the latest version of the database 140, 168 has the information to recover to any previously offloaded version of the backup entity directly from the cloud object store 164a . . . 164n (i.e., with no staging to operational recovery storage 130). This also allows the universal data mover 150 to offload a virtual machine to multiple cloud storage repositories in parallel (e.g., weekly offloads for VM1 go to cloud object store 164a, and monthly offloads of VM1 go to cloud object store 164n). This would allow Service Level Agreement (SLA) driven cloud object stores 164a . . . 164n.

Figure 3:
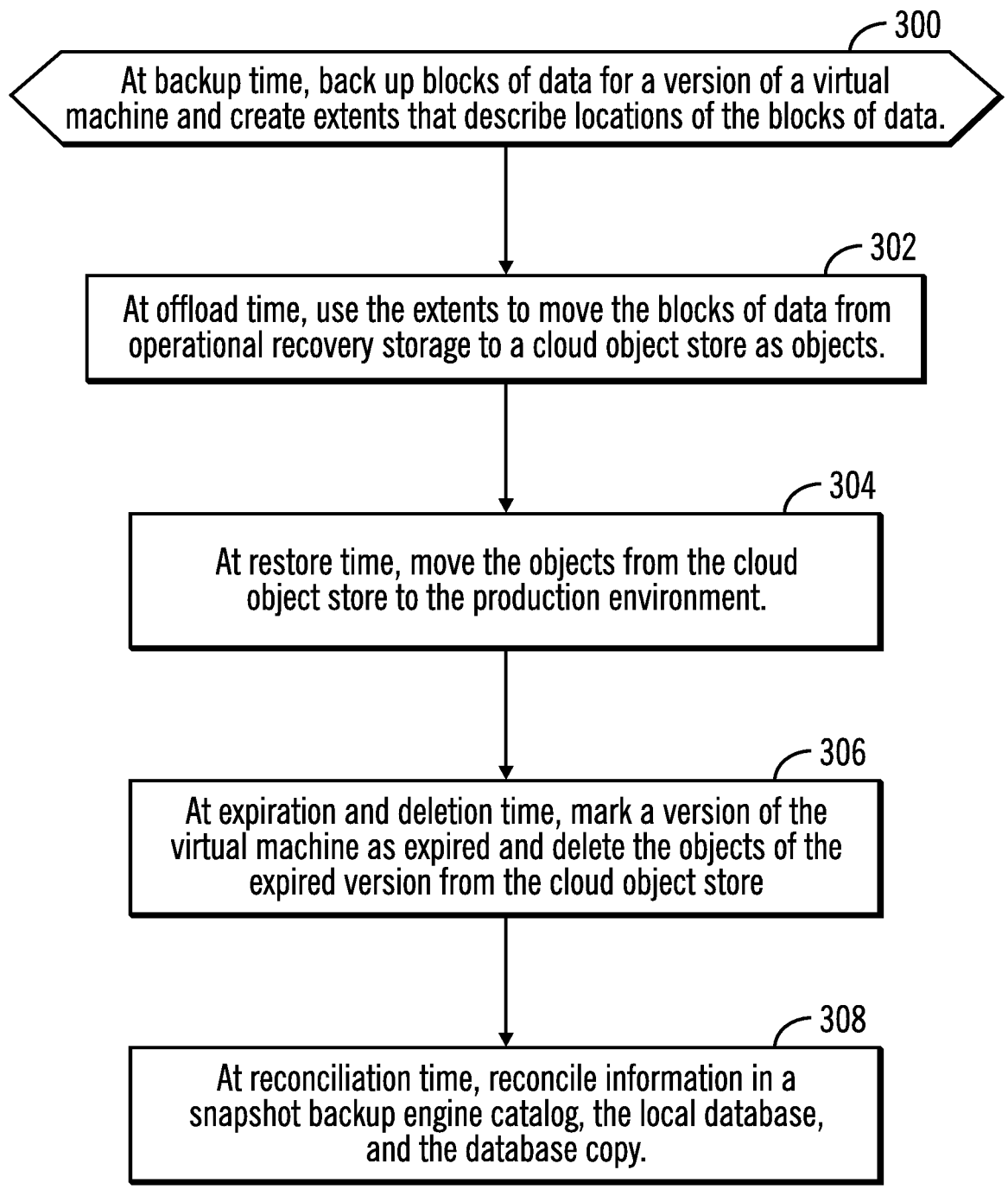
FIG. 3 illustrates, in a flowchart, operations for providing and managing data protection by using incremental forever for storage to and from cloud object stores in accordance with certain embodiments.

FIG. 3 illustrates, in a flowchart, operations for providing and managing data protection by using incremental forever for storage to and from cloud object stores 164a . . . 164n in accordance with certain embodiments. Control begins at block 300, with, at backup time, backing up blocks of data for a version of a virtual machine to operational recovery storage and creating extents that describe locations of the blocks of data in the operational storage. For a first-time ("full") backup, all blocks of data for a version of the virtual machine may be backed up, while, for an incremental backup, changed blocks of data are backed up. The extents indicate the blocks of data that were backed up and their locations for either the full or incremental backup.

In block 302, at offload time, the universal data mover 150 uses the extents to move the blocks of data for the version of the virtual machine from operational recovery storage to a cloud object store as objects. In block 304, at restore time, the universal data mover 150 moves the objects from the cloud object store 164a ... 164n for the version of the virtual machine to the production environment 100. In block 306, at expiration and deletion time, the universal data mover 150 marks a version (from one or more stored versions) of the virtual machine as expired and deletes the objects of the expired version from the cloud object store 164a ... 164n. In block 308, at reconciliation time, the universal data mover 150 reconciles information in the snapshot backup engine catalog 116, the local database 140, and the database copy 168 for the version of the virtual machine.

Figure 4:
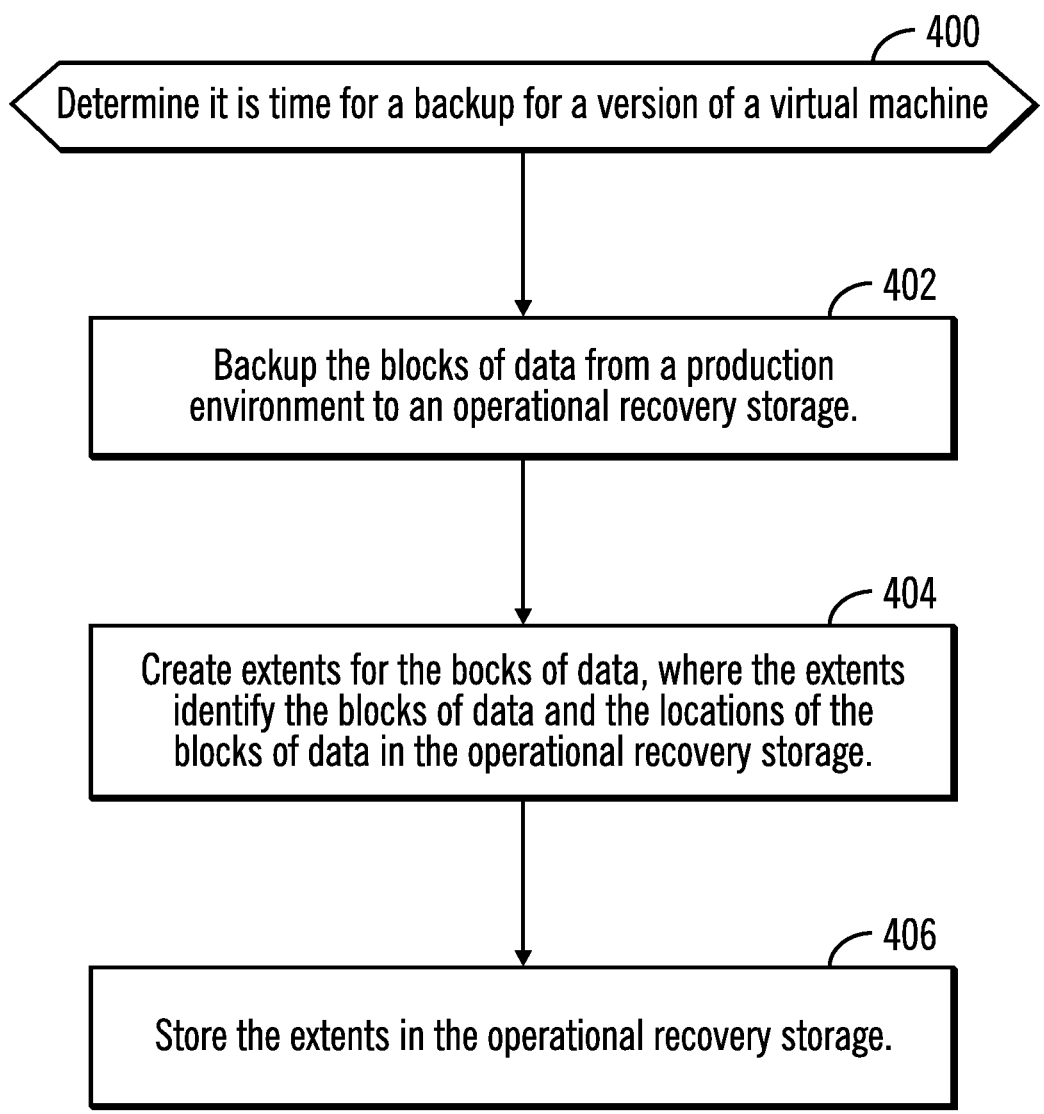
FIG. 4 illustrates, in a flowchart, operations for backup in accordance with certain embodiments.

FIG. 4 illustrates, in a flowchart, operations for backup in accordance with certain embodiments. Control begins at block 400 with the universal data mover tool 120 or the snapshot backup engine data mover 112 determining that it is time for a backup for a version of a virtual machine. In certain embodiments, the universal data mover tool 120 or the snapshot backup engine data mover 112 receives a request for the backup (e.g., from a system administrator). In other embodiments, the universal data mover tool 120 or the snapshot backup engine data mover 112 uses a backup policy to determine when to perform the backup (e.g., perform the backup daily). In block 402, the universal data mover tool 120 or the snapshot backup engine data mover 112 backs up the blocks of data from the production environment 100 to the operational recovery storage 130. In block 404, the universal data mover tool 120 or the snapshot backup engine data mover 112 creates extents for the blocks of data, where the extents identify the blocks of data and the locations of the blocks of data in the operational recovery storage. In certain embodiments, for an incremental backup, the changed block extents are captured per virtual machine and lists of the extents per backup entity are stored in the operational recovery storage 130. In block 404, the universal data mover tool 120 or the snapshot backup engine data mover 112 stores the extents 138 in the operational recovery storage 130.

In certain embodiments, at backup time, the snapshot backup engine invoker 114 invokes the universal data mover 150 to query the changed block extents using workload specific Application Programming Interfaces (APIs) and create an extent list per backup entity. These extent lists are stored in the operational recovery storage until the time of the offload. Offloads may occur immediately after the backup to operational recovery or at a later point in time.

Figure 5A:
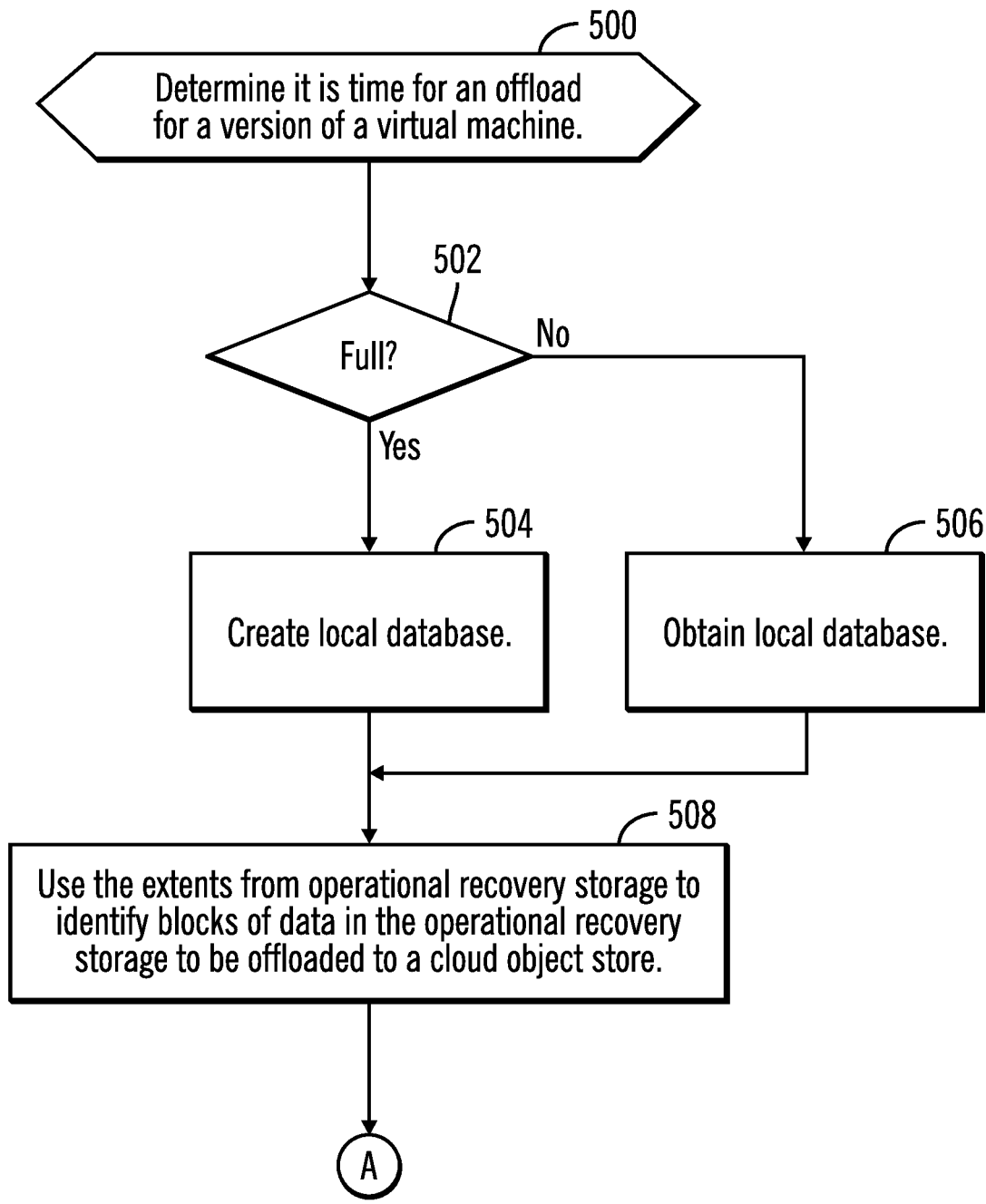
FIGS. 5A and 5B illustrate, in a flowchart, operations for offload in accordance with certain embodiments.
Figure 5B:
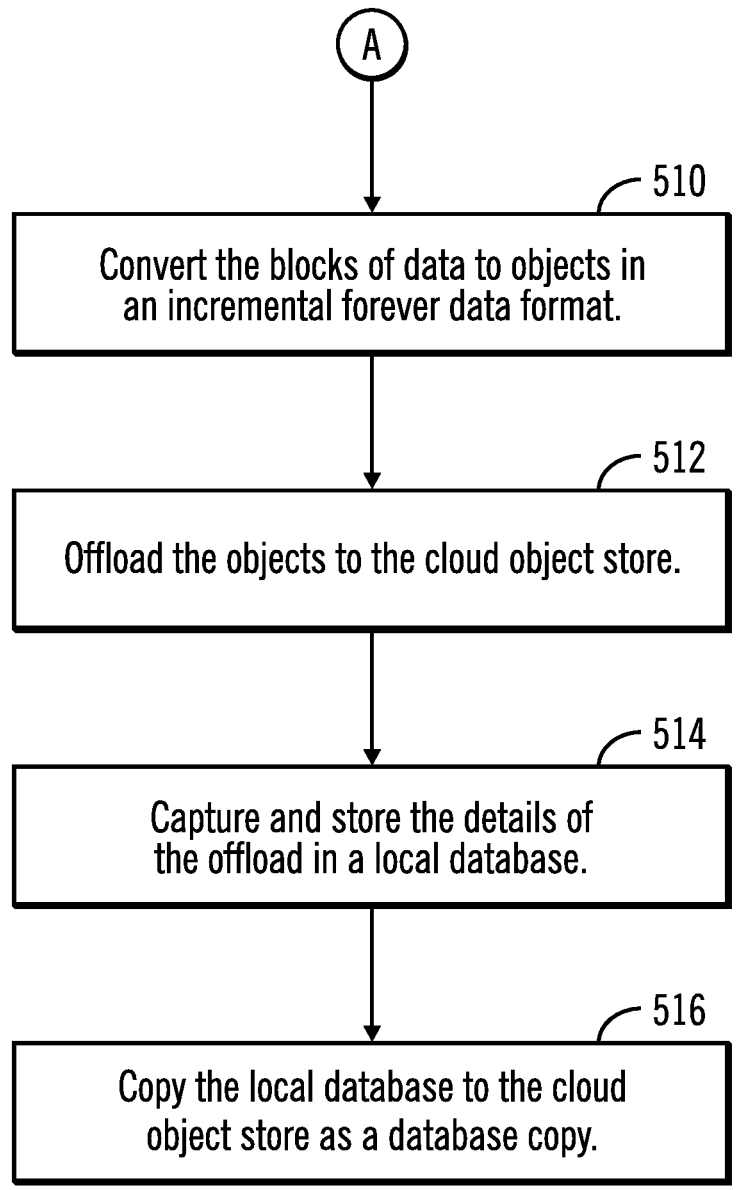

FIGS. 5A and 5B illustrate, in a flowchart, operations for offload in accordance with certain embodiments. Control begins at block 500 with the universal data mover 150 determining that it is time for an offload for a version of a virtual machine. In certain embodiments, the universal data mover 150 receives a request for the offload (e.g., from a system administrator). In other embodiments, the universal data mover 150 uses a offload policy to determine when to perform the offload (e.g., perform the offload daily).

In block 502, the universal data mover 150 determines whether this is a full offload. If so, processing continues to block 504, otherwise, it is an incremental offload and processing continues to block 506.

In block 504, the universal data mover 150 creates a local database 140. In block 506, the universal data mover 150 retrieves the local database 140. In other embodiments, the universal data mover 150 may retrieve the database copy 168 (which is a copy of the local database 140).

In block 508, the universal data mover 150 uses the extents 138 from the operational recovery storage 130 to identify blocks of data in the operational recovery storage 130 (e.g., from the file 132, the snapshot(T1) 134, and/or the snapshot(T2) 136) to the cloud object store 164a ... 164n. For example, the extents identify the blocks of data to be offloaded and indicate whether the blocks of data are in the file 132, the snapshot(T1) 134 or the snapshot(T2) 136. From block 508 (FIG. 5A), processing continues to block 510 (FIG. 5B).

In block 510, the universal data mover 150 converts the blocks of data to objects in an incremental forever data format. In block 512, the universal data mover 150 offloads (moves) the objects to the cloud object store 164a ... 164n.

In block 514, the universal data mover 150 captures and stores the details of the offload in the local database 140. This may be done with the metadata and database manager 204. For example, the details include a number of control files, megablock data files, names of the control files and megablock data files, groupings, etc.

In block 516, the universal data mover 150 copies the local database 140 to the cloud object store 164 as a database copy 168. The database 140, 168 is a cumulative database that has information about previous versions of the virtual machine.

In embodiments in which the database copy 168 is retrieved for an incremental offload, the database copy 168 is used to store the details of the offload in block 514, and the database copy 168 is copied to the local database in block 516.

Thus, with embodiments, the universal data mover 150 uses the changed block extents to move blocks of data from the operational recovery storage 130 to the cloud object store 164a ... 164n, stores details of the offload to the metadata and database manager 204, and also offloads the local database 140 as a database copy 168 to the cloud object store 164a ... 164n. The database 168 is cumulative and stores the latest (current) version of the virtual machine, as well as, the previous versions of the virtual machine.

In certain embodiments, at offload time, the universal data mover 150 is invoked with pertinent extent lists and a location of the backup entity data on the operational recovery storage. The universal data mover 150 may directly access the extents on the operational recovery storage (without accessing the production environment 100).

For a first-time offload (which is known as a full offload), the universal data mover 150 creates the local database 140 and sends the local database 140 to the cloud object store 164a ... 164n for storage as the database copy 168. During the full offload (of all used blocks described by the extent list for the full offload), the objects created are described in the local database 140 and sent via a cloud communication protocol to the cloud object store 164a ... 164n. Once the objects are confirmed to be on the cloud object store 164a ... 164n, the local database 140 is committed. Once all objects for the backup entity are located on the cloud object store 164a ... 164n, the local database 140 is also stored to the cloud object store 164a ... 164n as the database copy 168. The snapshot backup engine invoker 114 (an operational recovery product) that invoked the universal data mover 150 updates the snapshot backup engine catalog 116 with the details about the full offload.

For a subsequent offload (which is known as an incremental offload), the universal data mover 150 acquires the backup entity's existing database copy 168 from the cloud object store 164a . . . 164n as local database 140. During the incremental offload (in this case of changed blocks described by the extent list), new objects are newly described and existing objects are updated in the local database 140. The new objects (changed data only) are sent via a cloud communication protocol to the cloud object store 164a . . . 164n. Once the objects are confirmed to be on the cloud object store 164a . . . 164n, the local database 140 is committed. Once all objects for the backup entity are located on the cloud object store 164a . . . 164n, the local database 140 is also sent to the cloud object store 164a . . . 164n and stored therein as database copy 168. The snapshot backup engine invoker 114 that invoked the universal data mover 150 updates the snapshot backup engine catalog 116 with the details about the incremental offload.

With embodiments, offloads may be done at any point-in-time after a backup. In certain embodiments, a certain number of versions of the virtual machine may be backed up or versions of the virtual machine for a certain number of days (e.g., 7) may be backed up, with a once a month offload to the cloud data store 164a . . . 164n (after the backup of the last offloaded backup point is already expired from the operational recovery storage 130). This is because embodiments track extents/changes and calculate the changes after the fact from any previous point in time to any of the backups that are stored.

Figure 6:
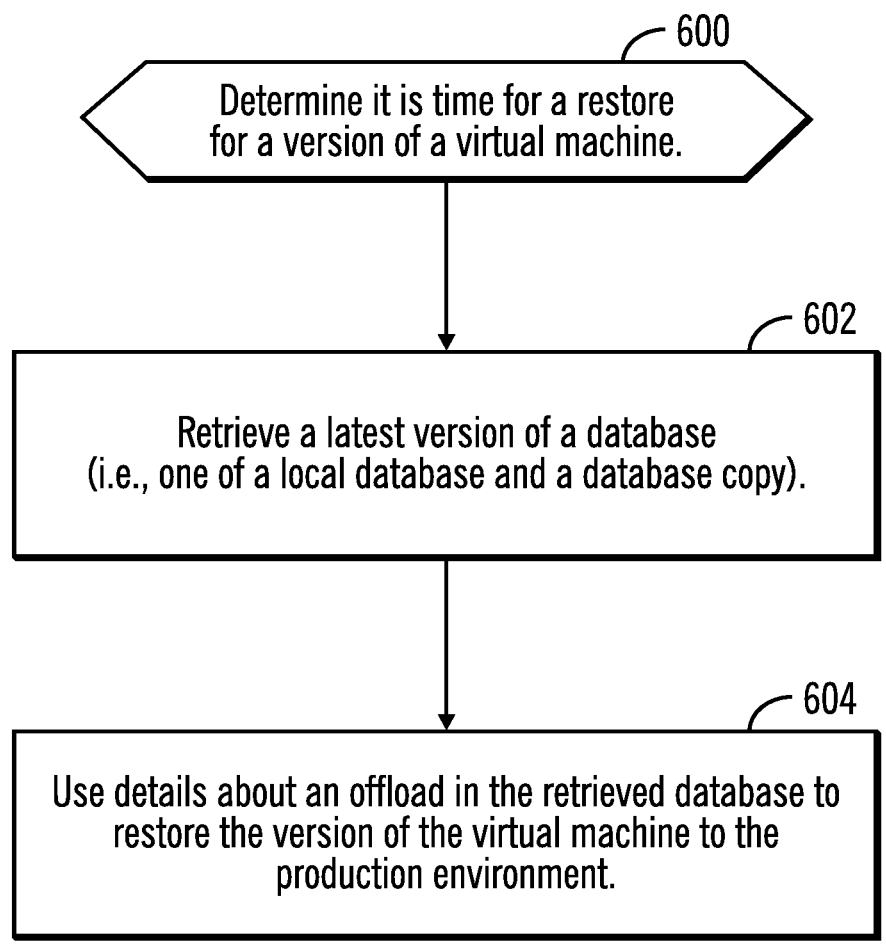
FIG. 6 illustrates, in a flowchart, operations for restore in accordance with certain embodiments.

FIG. 6 illustrates, in a flowchart, operations for restore in accordance with certain embodiments. Control begins at block 600 with the universal data mover 150 determining that it is time for a restore for a version of a virtual machine. In certain embodiments, the universal data mover 150 receives a request for the restore (e.g., from a system administrator). In other embodiments, the universal data mover 150 uses a restore policy to determine when to perform the restore (e.g., perform the restore yearly). In block 602, the universal data mover 150 retrieves the latest version of the database (by retrieving either database 140 or database copy 168). In block 604, the universal data mover 150 uses details about an offload in the retrieved database to restore the version of the virtual machine to the production environment 100. This restores the blocks of data stored as objects for that version of the virtual machine. The restoring may include transforming the objects in the incremental forever data format to blocks of data.

In certain embodiments, having the local database 140 is an optimization that saves the cost of going to the cloud storage 164a . . . 164n and retrieving the database copy 168. Thus, embodiments retrieve the local database 140, if it is available, and, if it is not available, embodiments retrieve the database copy 168.

In certain embodiments, the universal data mover 150 is invoked with the backup entity name, the version of the virtual machine desired, and production environment details. The universal data mover 150 acquires the backup entity's object data from the cloud object store 164a . . . 164n. Using the database copy 168, the universal data mover 150 restores the data directly to the production environment 100 (e.g., using workload specific APIs).

Figure 7:
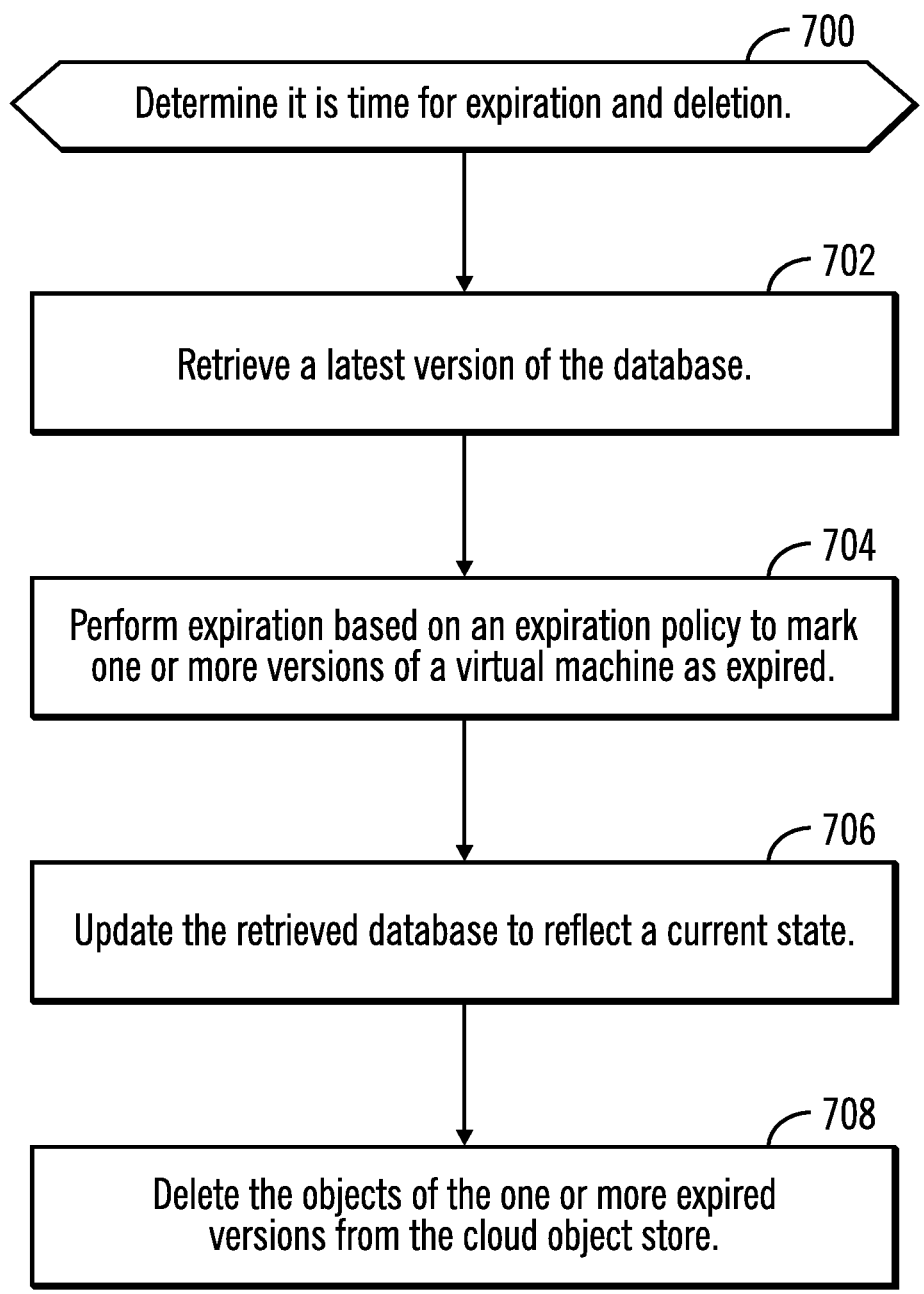
FIG. 7 illustrates, in a flowchart, operations for expiration and deletion in accordance with certain embodiments.

FIG. 7 illustrates, in a flowchart, operations for expiration and deletion in accordance with certain embodiments. Control begins at block 700 with the universal data mover 150 determining that it is time for expiration and deletion. In certain embodiments, the universal data mover 150 receives a request for the expiration and deletion (e.g., from a system administrator). In other embodiments, the universal data mover 150 uses an expiration policy to determine when to perform the expiration and deletion (e.g., perform the expiration and deletion daily). In block 702, the universal data mover 150 retrieves the latest version of the database (either database 140 or database copy 168). In block 704, the universal data mover 150 performs expiration based on the expiration policy to mark one or more versions of a virtual machine as expired. In certain embodiments, the expiration policy describes, for example, how many versions of the virtual machine to keep in the cloud storage 164a . . . 164n. Then, during expiration the universal data mover 150 is given the number of versions of the virtual machine to keep and marks any extra versions of the virtual machine as expired in the database that was retrieved.

In block 706, the universal data mover 150 updates the retrieved database to reflect a current state. For example, the database is updated with the number of versions of the virtual machine being stored currently, a relationship count among objects, etc. In certain embodiments, the universal data mover 150 may also update the database that was not retrieved (either database 140 or database copy 168) or copy the updated database to the database that was not updated (either database 140 or database copy 168).

In block 708, the universal data mover 150 deletes the objects of the one or more expired versions from the cloud object store 164a . . . 164n.

As needed, the snapshot backup engine 110 keeps a catalog of offload backups/versions and may invoke the universal data mover 150 to delete offloads that are no longer needed. The universal data mover 150 uses the database copy 168 to provide an efficient mechanism to track when cloud objects (which are aggregates of blocks of data described by multiple extents) may be physically deleted from the cloud object store 164a . . . 164n.

Figure 8:
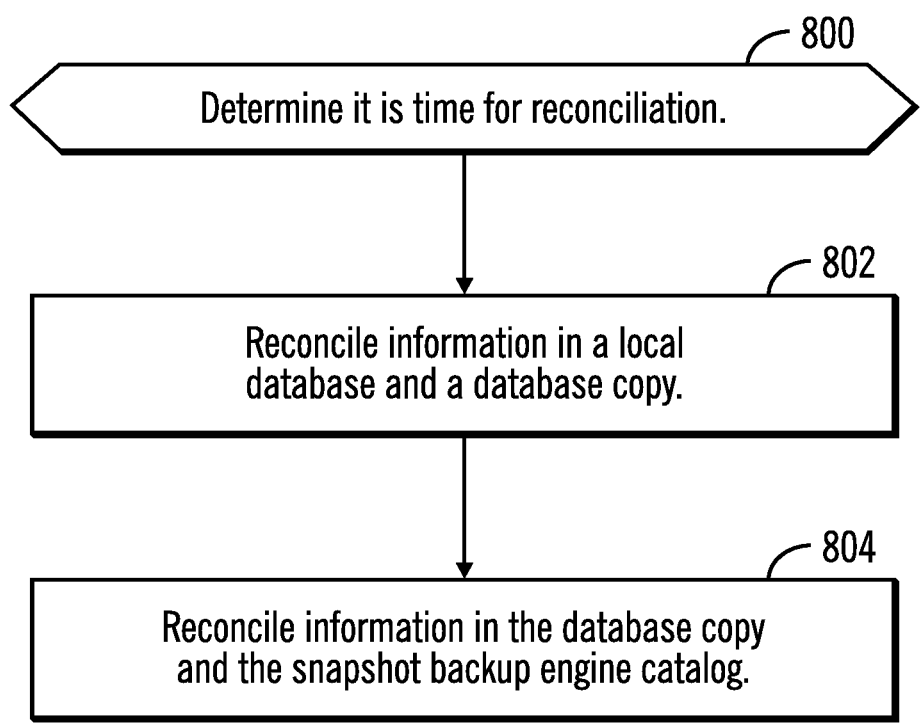
FIG. 8 illustrates, in a flowchart, operations for reconciliation in accordance with certain embodiments.

FIG. 8 illustrates, in a flowchart, operations for reconciliation in accordance with certain embodiments. Control begins at block 800 with the universal data mover 150 determining that it is time for a reconciliation. In certain embodiments, the universal data mover 150 receives a request for the reconciliation (e.g., from a system administrator). In other embodiments, the universal data mover 150 uses a reconciliation policy to determine when to perform the reconciliation (e.g., perform the reconciliation daily). In block 802, the universal data mover reconciles information in a local database and a database copy in the cloud object store. For example, version information and relationship counts among objects may be updated to keep the local database and the database copy in sync. This processing may also expire and delete versions.

In block 804 the universal data mover 150 reconciles information in the database copy 168 in the cloud object store 164 and the snapshot backup engine catalog 116.

Thus, the universal data mover 150 may also be invoked in reconcile mode to check an offload on the cloud object store 164a . . . 164n. This reconcile may validate that the database copy 168 entries match existing objects on the cloud object store 164a . . . 164n.

In certain embodiments, with reference to control, the offload and restore operations are driven through an interface of the snapshot backup engine 110. In certain embodiments, the snapshot backup engine 110 includes code to invoke the universal data mover tool 120 for collecting extents, offloading blocks of data or recovering blocks of data. The snapshot backup engine 110 manages policy and versioning (e.g., how often to offload data, how many versions to keep, etc.). The snapshot backup engine 110 also manages configuration of the cloud object store 164a . . . 164n. The snapshot backup engine 110 provides a mechanism to add units of storage, assign virtual machines to the units of storage, and define an offload policy (e.g., a number of versions to keep, a frequency of offload, etc.).

The universal data mover tool 120 and any related libraries and dynamic link libraries are provided to the snapshot backup engine 110 to enable the snapshot backup engine 110 to invoke the universal data mover tool 120.

With reference to injection and configuration of the code, the snapshot backup engine 110 sets up the execution environment for the universal data mover 150. The snapshot backup engine 110 injects the universal data mover 150 and the dependent libraries (there is no install) to the production environment 100. Once code is injected, the code is left in the environment until an upgrade is available, and the snapshot backup engine 110 manages re-pushing this code.

With reference to a backup from the production environment 100 to the operational recovery storage 130, the snapshot backup engine 110 interacts with the production environment 100 to create the snapshot of the virtual machine at a particular point in time. The snapshot backup engine 110 calls the universal data mover 150 to capture used blocks information or extents for the incremental backup. The universal data mover 150 captures extents and delivers them to storage on the operational recovery storage 130. The snapshot backup engine 110 completes transfer of data to the operational recovery storage 130 and cleans up the snapshot. The snapshot backup engine 110 merges incremental data on the operational recovery storage 130 to create a complete snapshot (such as snapshot 134 or 136), while the file system file 132 retains a previous version.

In certain embodiments, there are multiple universal data movers. With reference to offload from the operational recovery storage 130 to the cloud object store 164a . . . 164n, the snapshot backup engine 110 runs an offload job, collects all virtual machines in the operation, and distributes the work to 1-N universal data movers. The snapshot backup engine 110 creates the appropriate files (e.g., JavaScript® Object Notation (JSON) files) and invokes each universal data mover with a set of VMs. The universal data mover 150 mounts the proper volumes for the list of VM's, restores the local database 140 (e.g., by copying the database copy 168 to the local database 140) and control files (from the cloud object store 164a . . . 164n or potentially from a local copy if it exists) so it can capture the incremental information. (JavaScript is a registered trademark of Oracle Corporation in the United States and/or other countries.)

The local database 140 may be stored in the operational recovery storage 130 or may be stored remotely. Also, the local database 140 is saved with the objects in the cloud object store 164a . . . 164n as database copy 168.

The universal data mover 150 transfers the appropriate data (configuration files, data files (e.g., DAT files), and control files) to the cloud object store 164a . . . 164n, and, if all goes well, commits the version. The universal data mover 150 updates the local database 140 with the appropriate grouping information and performs any reclamation if needed. With reclamation, over time, to fill one extent of data, embodiments go to different versions of backups, but this gets fragmented, so reclamation tries to lessen the fragmentation. The grouping information may be described as relationship information about the objects. The universal data mover 150 stores the database file on the cloud object store 164a . . . 164n under the associated version. The universal data mover 150 processes multiple VM's in parallel (either with a parallel process or parallel threads). The universal data mover 150 processes the disks and extents of multiple backups taken between offload backups and merges the information for a single incremental offload.

With reference to query (enumeration), the snapshot backup engine 110 invokes the universal data mover to obtain information about the objects stored on the cloud object store 164a . . . 164n. This includes a query all virtual machines, query all versions for a virtual machine, etc. The universal data mover 150 uses queries to the local database 140 to find all the objects associated with a specific version, a group version, etc.

With reference to restore (recovery from the cloud object store 164a . . . 164n to the production environment 100, the snapshot backup engine 110 drives a restore of a specific virtual machine version or a single disk (e.g., of production storage) from a virtual machine offload version on the cloud object store 164a . . . 164n. The snapshot backup engine 110 calls the universal data mover 110 to restore configuration files to the operational recovery storage 130 for the specific version. The snapshot backup engine 110 creates the virtual machine and allocates the proper disks to the production storage 108 on the production environment 100 for restore. Then, the snapshot backup engine 110 calls the universal data mover 150 to do the actual data movement to the disks of the production storage 108. In certain embodiments, the universal data mover 150 creates a snapshot for recovery and uses a Virtual Disk Development Kit (VDDK) to perform the actual data movement to restore the blocks of data to the production environment 100. In alternative embodiments, the universal data mover 150 performs recovery using different workload specific kits to move the blocks of data to the production environment 100. The kits may be used to copy the objects as blocks of data to the production environment 100. Once data is restored, the snapshot backup engine 110 finalizes the virtual machine (e.g., sending a notification that the restore is complete and the virtual machine is ready for use, resetting the Internet Protocol (IP) address, etc.).

With reference to expiration and deletion, based on an expiration policy, the snapshot backup engine 110 calls the universal data mover 150 to "expire" versions. The universal data mover 150 restores the database copy 168 (to make sure it has current information) and figures out which objects may be removed from the cloud object store 164a . . . 164n. In certain embodiments, the snapshot backup engine 110 keeps track of information that is to be reconciled with the local database 140 and the database copy 168. The universal data mover 150 sends delete operations for the objects that are to be deleted and any data files and/or control files that do not belong to any other version. The universal data mover 150 performs the appropriate delete operations on the database copy 168 to remove a top level version and any data and control files that do not belong to any other group. The data and control files that are also members of other groups may have their relationship counts decreased. A relationship count may be described as a count of how many groups are associated with a megablock. Each offload increases a relationship count.

With reference to reconciling, information may be stored in three distinct places about backups: in the snapshot backup engine catalog, in the local database 140, and in the database copy 168. Embodiments validate that all locations are in sync. The snapshot backup engine 110 invokes the universal data mover 150 to reconcile the local database 140 and the database copy 168. Then, the snapshot backup engine 110 uses information (from the universal data mover 150) to update snapshot backup engine catalog. This operation may be run after a delete of a version.

With reference to the incremental forever data format, in certain embodiments, searchable object entries are stored for each object stored in the cloud object store 164a . . . 164n and group leader entries are stored for each version of a virtual machine. Group leader entries may be utilized to group together object entries that are associated with a given version of the virtual machine. Thus, the group leader entries enable identifying the objects that are needed to restore a particular version and, similarly, the objects that may be deleted upon expiration of the version. Further, object entries may be associated with multiple group leaders to enable storing multiple backup versions that share common objects without having to store multiple copies of the those objects in the cloud object store 164a . . . 164n. In certain embodiments, the searchable object entries and the group leader entries may be stored in the database 140, 168.

In certain embodiments, during an initial full offload of the production environment 100 to the cloud object store 164a . . . 164n, a group leader entry is created for the version of the virtual machine. In certain embodiments, the group leader entry contains an identifier for the group leader (e.g., a unique name or code), an associated object entries field in which identifiers for associated object entries may later be added, and information pertaining to any specified expiration policies. One or more expiration policies may control when the group leader entry should expire, if at all.

The production disk is logically divided into megablocks and blocks. The terms "megablock" and "block", as used herein, refer to finite regions of the production disk. The megablocks and blocks established during the initial full backup remain the same for subsequent incremental backups of the production disk.

Objects are created from the blocks of data by creating one or more megablock data files, one or more control files, and a bitmap file. The megablock data file contains blocks of data from a particular megablock. During this initial full backup, a megablock data file is created for each megablock on production disk whose blocks contain production data. The control file describes the structure of a particular megablock using a control file record (i.e., pointer) for each block within the megablock. A control file is created for each megablock on production disk. The bitmap file describes the structure of production data on the production disk. Thus, the objects contain information to later restore the blocks of data to the production disk directly.

An object entry is created for each of the objects offloaded to the clout object store 164a . . . 164n. In certain embodiments, each object entry contains an identifier for the object entry (e.g., a unique name or code), the storage location of the corresponding object in the cloud object store 164a . . . 164n, and an associated group leader entries field in which identifiers for associated group leader entries may be added.

The object entries for objects to be offloaded are associated with the group leader entries. This enables identifying the objects that are associated with the version of the virtual machine by accessing the group leader entry, which contains references to the associated object entries.

In certain embodiments, during an incremental backup, after a full backup has been performed, a new group leader entry is created for this incremental version. The changed blocks of data are identified. If a megablock has not changed since the last offload was performed, then, the megablock's corresponding object entries from the prior version (i.e., the object entries for the megablock's megablock data file and control file) are associated with the new group leader entry. If blocks of data within the first megablock have changed since the last offload was performed, then the blocks of data (either the changed blocks of data or all of the blocks of data, depending on various factors) within the megablock are copied to a new megablock data file. Then, the objects (i.e., the bitmap file, and any newly created megablock data files and control files) are stored in the cloud object store 164a . . . 164n.

In certain embodiments, expiration of a version of the virtual machine, may be initiated by a user or based on the expiration policy. The group leader entry of the version to be expired is identified, then the object entries that are associated with the expired group leader entry are identified using the object identifiers referenced in the expired group leader entry. If an object entry is also associated with another group leader entry (i.e., the object to which the object entry corresponds is needed to restore a newer backup version), then, the object entry is disassociated from the expired group leader entry, otherwise, the object entry is deleted. After the object entry is deleted, the corresponding object may be marked for deletion.

With reference to object naming mappings and grouping, a common data format is used for VM backups. The common data format is built on peer grouping, uses megablock data files of size 128 Megabytes (M) or 1 Gigabyte (G), and uses a control file that contains the mapping for each megablock data file at 16 kilobytes (k) or 64 kilobytes (k) "chunks". Each disk has a bitmap file that all the control files that make up that disk. As versions progress, there are many megablock data files that contain pieces of that section on disk and, periodically, embodiments refresh the megablock data file and send up a new contiguous one. When mapping grouping objects to the cloud object store 164a . . . 164n, the database copy 168 contains the grouping information, and the cloud object store 164a . . . 164n has the data, control, and configuration files.

In certain embodiments, at a very high level, there are three group leaders:

\FULL\VMNAME—a top group leader and manages a final commit

\FULL\VMNAME\SNAPSHOT_000001000_20180101120000—a Level 1 group leader and contains configuration files \VMNAME\SNAPSHOT_000001000_20180101120000\Hard Disk 1\JOB000001001—a level 2 group leader and contains the megablock data files, the control files, and the bitmap file for each disk.

In certain embodiments, to facilitate unique versions in the database copy 168 and cloud object store 164a . . . 164n, a BackupVersionID is used to identify each version. Then, commit is performed on this top level. A top level is a group leader and is an atomic unit that may be committed. Everything (e.g., configuration files, local database, control files, megablock data files, etc.) for one virtual machine will be named with the naming schema starting with: \FULL\VMNAME (e.g., \FULL\\VM1, \FULL\\VM1 snapshot(t1), etc.).

Embodiments employ a technique to ensure expired versions are reflected in the database copy 168 and on the cloud object store 164a . . . 164n.

In certain embodiments, the data format used for objects offloaded to the cloud object store 164a . . . 164n is a common data format and may be used for any application data or hypervisor workload. This common data format allows for individual file inspection or recovery from longer term cloud object store 164*a* . . . 164*n* (without needed to access the production environment 100).

With embodiments, the combination of the self-describing database 140, 168 and the common data format allows for additional backend (i.e., cloud object store 164*a* . . . 164*n*) processing. For example, in a certain cloud storage system, embodiments may implement migration to tape or specific version tiering without having to migrate all the full+all incremental backups up to the desired version (in accordance with the same logic as restore of a specific version).

In certain embodiments, the naming schema of the objects in the cloud object store allows for efficient queries of which backup entities and versions are available (e.g., query for all available backup entities, query for all versions of a specific VM, database, etc.)

Embodiments also allow for optimizations that aid in operational recovery, such as maintaining a copy of the local database 140 on operational recovery storage to allow for more efficient offload and restores.

Embodiments perform true management of an incremental forever solution. Embodiments provide and manage an incremental forever solution on a cloud object store. In particular, embodiments provide the ability to capture used block extents during a backup (local snapshot). Also, embodiments manage relationships between objects in the cloud object store. In addition, embodiments manage expiration and deletion of versions and manage failed operations. Moreover, embodiments manage block of data to object mapping in an efficient manner.

Embodiments use incremental forever in an efficient manner for storage to cloud object stores. The cloud object stores may have a cloud storage architectures for block storage formats, file storage formats, and object storage formats. Embodiments offload operational recovery data (move data from operational recovery storage) to an external cloud repository. Embodiments transform data objects into block storage formats, such that the data objects may be stored and subsequently migrated to various storage tiers within the cloud storage for longer term storage. In certain embodiments, the storage tiers include fast disk (e.g., Solid State Drive (SSD) or Non-Volatile Memory express (NVMe)), slow disk (e.g., Serial Advanced Technology Attachment (SATA) drive), tape, etc. Embodiments maintain the ability to offload changed data only (via an incremental forever chain), control offload versions and, when needed, allow for recovery from the cloud object store directly to the production environment without having to stage first to the operational recovery storage.

Figure 9:
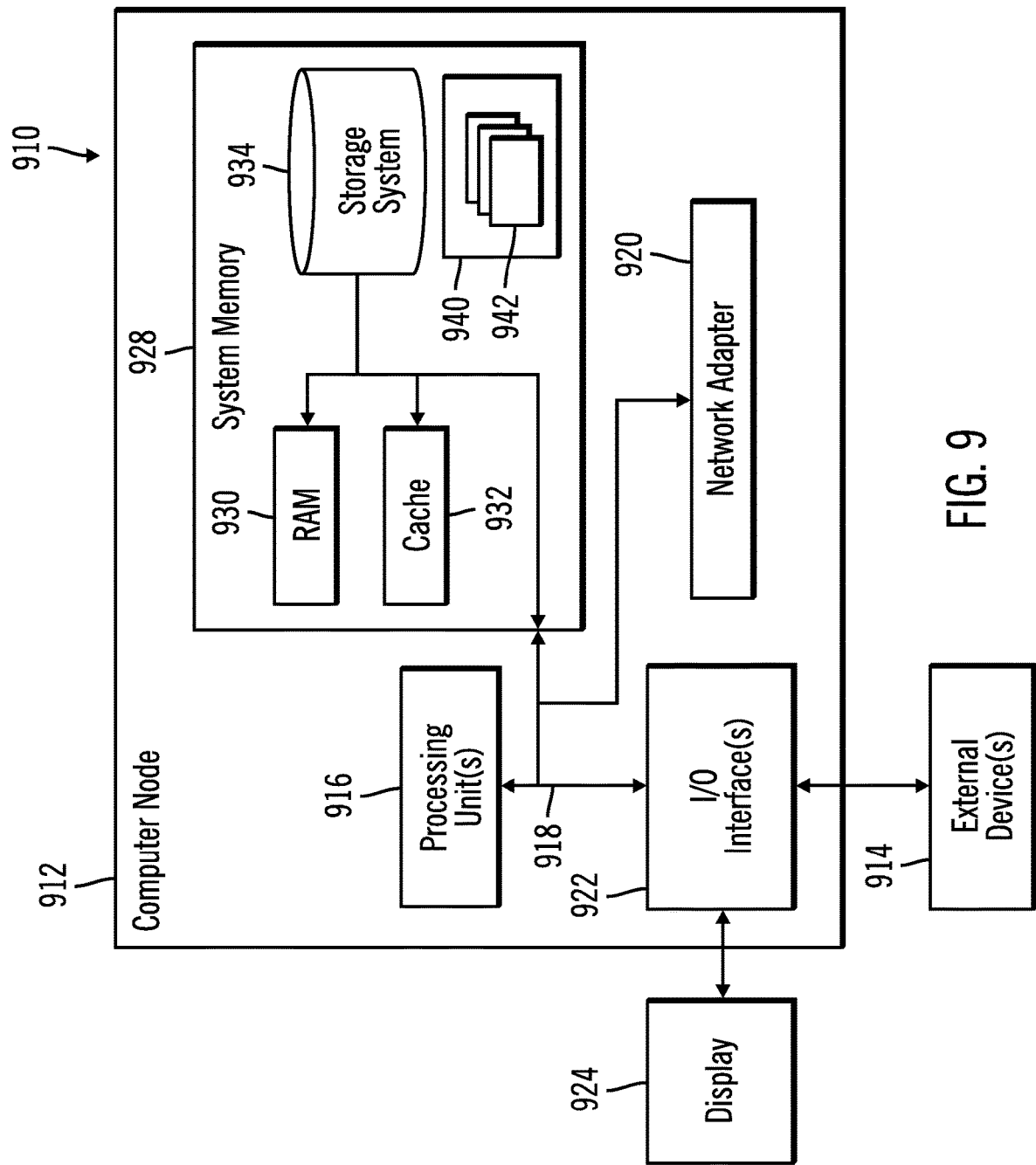
FIG. 9 illustrates a computing node in accordance with certain embodiments.

FIG. 9 illustrates a computing environment 910 in accordance with certain embodiments. In certain embodiments, the computing environment is a cloud computing environment. Referring to FIG. 9, computer node 912 is only one example of a suitable computing node and is not intended to suggest any limitation as to the scope of use or functionality of embodiments of the invention described herein. Regardless, computer node 912 is capable of being implemented and/or performing any of the functionality set forth hereinabove.

The computer node 912 may be a computer system, which is operational with numerous other general purpose or special purpose computing system environments or configurations. Examples of well-known computing systems, environments, and/or configurations that may be suitable for use with computer node 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 912 may be described in the general context of computer system executable instructions, such as program modules, being executed by a computer system. Generally, program modules may include routines, programs, objects, components, logic, data structures, and so on that perform particular tasks or implement particular abstract data types. Computer node 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer node 912 is shown in the form of a general-purpose computing device. The components of computer node 912 may include, but are not limited to, one or more processors or processing units 916, a system memory 928, and a bus 918 that couples various system components including system memory 928 to one or more processors or processing units 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 912 typically includes a variety of computer system readable media. Such media may be any available media that is accessible by computer node 912, and it includes both volatile and non-volatile media, removable and non-removable media.

System memory 928 can include computer system readable media in the form of volatile memory, such as random access memory (RAM) 930 and/or cache memory 932. Computer node 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As will be further depicted and described below, system memory 928 may include at least one program product having a set (e.g., at least one) of program modules that are configured to carry out the functions of embodiments of the invention.

Program/utility 940, having a set (at least one) of program modules 942, may be stored in system memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer node 912 may also communicate with one or more external devices 914 such as a keyboard, a pointing device, a display 924, etc.; one or more devices that enable a user to interact with computer node 912; and/or any devices (e.g., network card, modem, etc.) that enable computer node 912 to communicate with one or more other computing devices. Such communication can occur via Input/Output (I/O) interfaces 922. Still yet, computer node 912 can communicate with one or more networks such as a local area network (LAN), a general wide area network (WAN), and/or a public network (e.g., the Internet) via network adapter 920. As depicted, network adapter 920 communicates with the other components of computer node 912 via bus 918. It should be understood that although not shown, other hardware and/or software components could be used in conjunction with computer node 912. Examples, include, but are not limited to: microcode, device drivers, redundant processing units, external disk drive arrays, RAID systems, tape drives, and data archival storage systems, etc.

In certain embodiments, the production environment 100, the snapshot backup engine 110, the universal data mover 150, and the cloud server 162 may each have the architecture of computer node 912.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
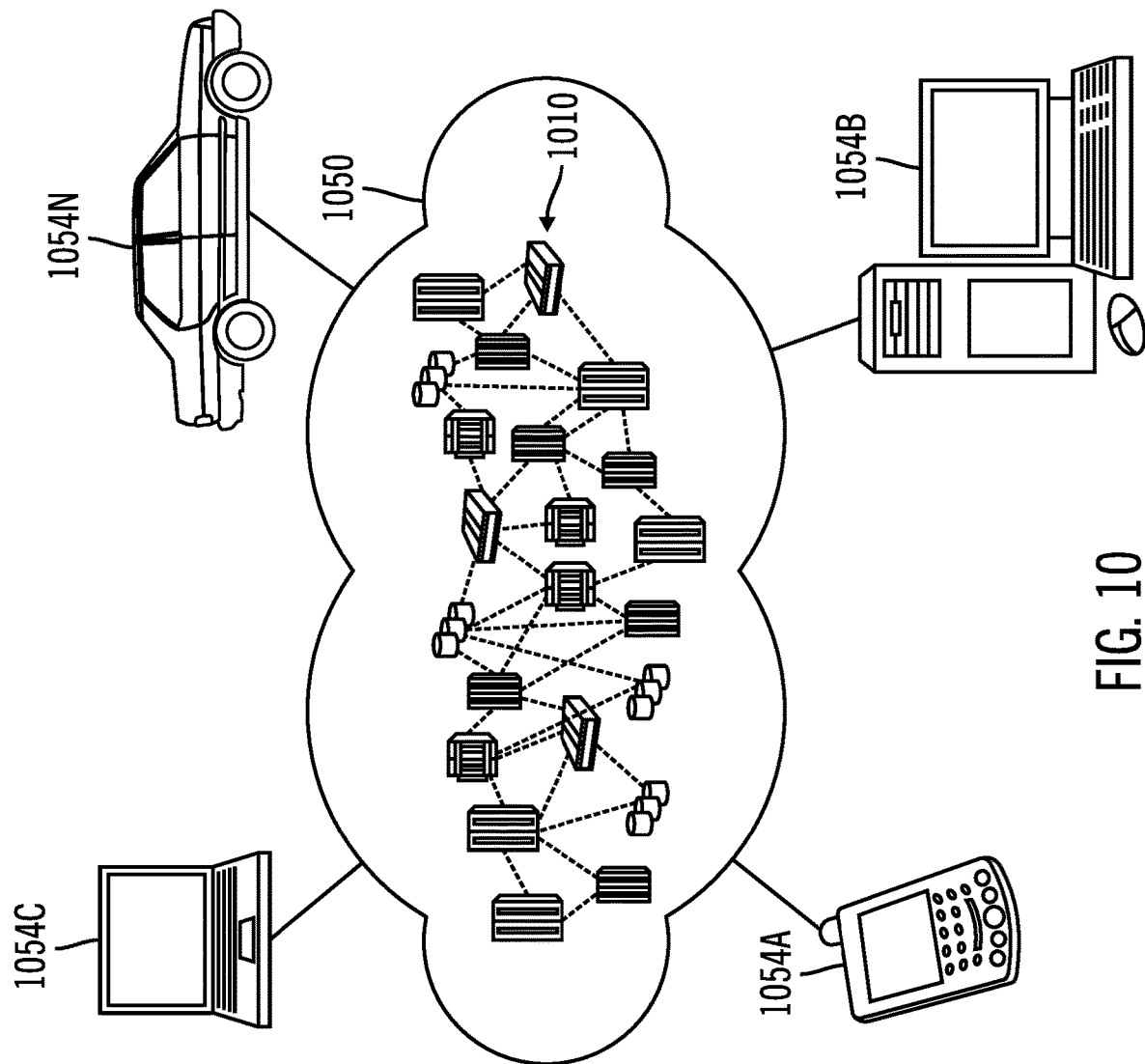
FIG. 10 illustrates a cloud computing environment in accordance with certain embodiments.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
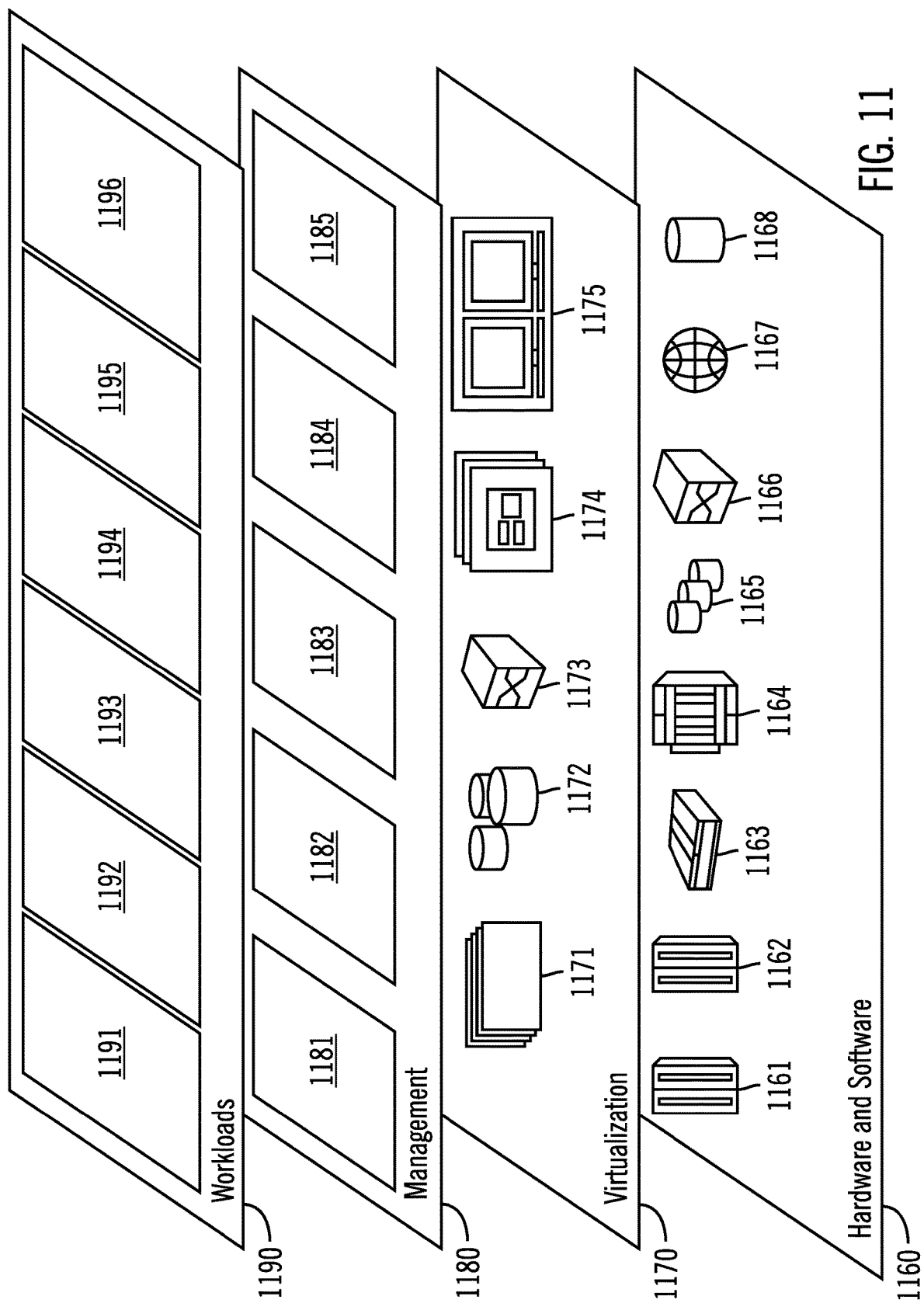
FIG. 11 illustrates abstraction model layers in accordance with certain embodiments.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and providing and managing data protection by using incremental forever for storage to cloud object stores 1196.

Thus, in certain embodiments, software or a program, implementing providing and managing of data protection by using incremental forever for storage to cloud object stores in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A computer program product, the computer program product comprising a computer readable storage medium having program code embodied therewith, the program code executable by at least one processor to perform operations comprising:
    determining that it is time for an offload;
    in response to determining that the offload is a full offload, creating a local database in operational recovery storage;
    in response to determining that the offload is an incremental offload, obtaining the local database from the operational recovery storage;
    using one or more extents to identify blocks of data for a version of a virtual machine in the operational recovery storage to be offloaded to a cloud object store, wherein each of the one or more extents identifies locations of the blocks of data;
    converting the blocks of data to objects for the version in an incremental forever data format;
    offloading the objects to the cloud object store;
    storing details of the offloading of the objects in the local database in the operational recovery storage; and
    copying the local database from the operational recovery storage to the cloud object store as a database copy.

2. The computer program product of claim 1, wherein the program code is executable by the at least one processor to perform further operations comprising:
    performing a restore by using the details of the offloading to restore the blocks of data offloaded as objects from the cloud object store to a production environment.

3. The computer program product of claim 1, wherein the program code is executable by the at least one processor to perform further operations comprising:
    at expiration and deletion time,
        marking the version of the virtual machine as expired; and
        deleting the objects for the version of the virtual machine from the cloud object store.

4. The computer program product of claim 1, wherein the program code is executable by the at least one processor to perform further operations comprising:
    at reconciliation time, reconciling information in a snapshot backup engine catalog, the local database, and the database copy.

5. The computer program product of claim 1, wherein a production environment, a snapshot backup engine, a universal data mover, a cloud server, the operational recovery storage, and the cloud object store are part of a cloud computing environment.

6. The computer program product of claim 1, wherein a Software as a Service (SaaS) is configured to perform the operations of the computer program product.

7. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations comprising:

determining that it is time for an offload;

in response to determining that the offload is a full offload, creating a local database in operational recovery storage;

in response to determining that the offload is an incremental offload, obtaining the local database from the operational recovery storage;

using one or more extents to identify blocks of data for a version of a virtual machine in the operational recovery storage to be offloaded to a cloud object store, wherein each of the one or more extents identifies locations of the blocks of data;

converting the blocks of data to objects for the version in an incremental forever data format;

offloading the objects to the cloud object store;

storing details of the offloading of the objects in the local database in the operational recovery storage; and copying the local database from the operational recovery storage to the cloud object store as a database copy.

8. The computer system of claim 7, wherein the operations further comprise:

performing a restore by using the details of the offloading to restore the blocks of data offloaded as objects from the cloud object store to a production environment.

9. The computer system of claim 7, wherein the operations further comprise:

at expiration and deletion time, marking the version of the virtual machine as expired; and deleting the objects for the version of the virtual machine from the cloud object store.

10. The computer system of claim 7, wherein the operations further comprise:

at reconciliation time, reconciling information in a snapshot backup engine catalog, the local database, and the database copy.

11. The computer system of claim 7, wherein a production environment, a snapshot backup engine, a universal data mover, a cloud server, the operational recovery storage, and the cloud object store are part of a cloud computing environment.

12. The computer system of claim 7, wherein a Software as a Service (SaaS) is configured to perform the operations of the computer system.

13. A computer-implemented method, comprising operations for:

determining that it is time for an offload;

in response to determining that the offload is a full offload, creating a local database in operational recovery storage;

in response to determining that the offload is an incremental offload, obtaining the local database from the operational recovery storage;

using one or more extents to identify blocks of data for a version of a virtual machine in the operational recovery storage to be offloaded to a cloud object store, wherein each of the one or more extents identifies locations of the blocks of data;

converting the blocks of data to objects for the version in an incremental forever data format;

offloading the objects to the cloud object store;

storing details of the offloading of the objects in the local database in the operational recovery storage; and copying the local database from the operational recovery storage to the cloud object store as a database copy.

14. The computer-implemented method of claim 13, further comprising operations for:

performing a restore by using the details of the offloading to restore the blocks of data offloaded as objects from the cloud object store to a production environment.

15. The computer-implemented method of claim 13, further comprising operations for:

at expiration and deletion time, marking the version of the virtual machine as expired; and deleting the objects for the version of the virtual machine from the cloud object store.

16. The computer-implemented method of claim 13, further comprising operations for:

at reconciliation time, reconciling information in a snapshot backup engine catalog, the local database, and the database copy.

17. The computer-implemented method of claim 13, wherein a production environment, a snapshot backup engine, a universal data mover, a cloud server, the operational recovery storage, and the cloud object store are part of a cloud computing environment.

18. The computer-implemented method of claim 13, wherein a Software as a Service (SaaS) is configured to perform the operations of the computer-implemented method.

* * * * *